United States Patent
Bolze et al.

(10) Patent No.: US 9,455,487 B2
(45) Date of Patent: Sep. 27, 2016

(54) NON-PENETRATING SECURING DEVICE SYSTEM AND USE AND METHOD OF MAKING

(71) Applicant: Infinite Innovations Inc., Phoenix, AZ (US)

(72) Inventors: Eric Bolze, Phoenix, AZ (US); Alejandro Gonzalez, Avondale, AZ (US); Esteban Gonzalez, Tolleson, AZ (US); Eileen Bolze, Phoenix, AZ (US)

(73) Assignee: Infinite Innovations, Inc., Phoenix, AZ (US)

( * ) Notice: Subject to any disclaimer, the term of this patent is extended or adjusted under 35 U.S.C. 154(b) by 41 days.

(21) Appl. No.: 14/279,209

(22) Filed: May 15, 2014

(65) Prior Publication Data

US 2014/0339387 A1 Nov. 20, 2014

Related U.S. Application Data

(60) Provisional application No. 61/823,652, filed on May 15, 2013.

(51) Int. Cl.
*F16M 11/00* (2006.01)
*H01Q 1/12* (2006.01)
*F24J 2/52* (2006.01)

(52) U.S. Cl.
CPC ........... *H01Q 1/1221* (2013.01); *F24J 2/5247* (2013.01); *Y02E 10/47* (2013.01)

(58) Field of Classification Search
CPC ............ E04G 3/26; H02S 20/00; F24J 2/52; F24J 2/5247; H01Q 1/00; H01Q 1/1221; F16M 13/02
USPC ............. 248/237, 229.1, 229.12, 274.1, 304, 248/307, 309.1, 316.1, 316.4, 689, 690, 248/211, 215, 229.14, 229.2, 229.24, 248/231.61

See application file for complete search history.

(56) References Cited

U.S. PATENT DOCUMENTS

| | | | | |
|---|---|---|---|---|
| 5,711,397 A * | 1/1998 | Flora | ................. | A62B 35/0081 182/3 |
| 6,053,279 A * | 4/2000 | McKenna | ............ | A62B 5/0081 182/3 |
| 6,398,174 B1 * | 6/2002 | Emalfarb | ............... | A47G 7/044 248/214 |
| 6,543,737 B2 * | 4/2003 | Decker | ................ | A47K 10/185 248/316.1 |
| 8,070,123 B2 * | 12/2011 | Yu | ........................ | F16M 11/105 248/346.06 |
| 2007/0001088 A1 * | 1/2007 | Bowman | ................ | A47G 7/047 248/690 |
| 2014/0026946 A1 * | 1/2014 | West | ..................... | F24J 2/5205 136/251 |

\* cited by examiner

*Primary Examiner* — Todd M Epps
(74) *Attorney, Agent, or Firm* — Gary F. Witting

(57) ABSTRACT

An exemplary system for securing objects to a substrate with a non-penetrating securing device. The non-penetrating securing device is a non-destructive device that allows objects of a variety of sizes (large and small) to be securely mounted to or on fragile substrates.

15 Claims, 9 Drawing Sheets

NON-PENETRATING SECURING DEVICE SYSTEM AND USE AND METHOD OF MAKING

FIELD OF INVENTION

This application claims the benefit of U.S. Provisional Application No. 61/823,652, filed on May 15, 2013.

BACKGROUND

Currently and in the past, the securing and placement of a structure or structures on sensitive and fragile structures, substrates, and the like has either never been accomplished or has been accomplished by penetrating, destructive and/or a structurally weakening processes and/or devices. These conventional processes and/or devices typically require removal of the fragile substrates to expose underlying layers that support the sensitive and fragile substrates. The removal of the fragile substrates subjects the fragile substrates to several destructive processes such as cutting, chipping, and other forcible methods of removal to expose the underlying layers. The underlying layers are then subjected to the drilling of holes, the cutting of other openings of openings, using of nails, and other structurally weakening processes in and on the under layers that support the sensitive as will as fragile substrates. All of these process and supporting devices ultimately weaken the underlying layers and ultimately the resulting structure as a whole making it weak and prone to sustained long term maintenance issues.

Typically, conventional placement of a light fixture, a platform for supporting other structures, or the running of wire or conduit on a tile or concrete roof requires one or more destructive processes to be used. For example, in the case of putting a light in a tile or concrete roof entails pulling one or two tiles away from the roof and nailing a bracket into the roof. In some cases, parts of the sub roof is removed to reveal the trusses under the sub-roof. The bracket is then nailed to the trusses for suitable support. Subsequently, the sub-roof has to be refitted, the tile has to be re-cut and fitted to accommodate the new bracket and the new structure has to be mounted to the new bracket.

As can be seen, this is a complicated process that is labor and time intensive. Additionally, because of the destructive nature of the retro-fit, the retrofit introduces the possibly of several flaws into the integrity of the roof structure such as leaks, structural damage of the roof itself, and the like that were not possible at the beginning of the retro-fit. Thus, making the placement and use of a conventionally retro-fitted structure or device which is most advantageous to be place on a roof, a high risk project and quite possibility making the project not capable of being done.

Also, it should be noted that with some structural projects that are meant to be permanently located on roofs are not always as permanent as originally thought. As time and technology change with time, newer technology becomes available and necessitates the replacement of older technology, thereby requiring removal of the old permanent structure. Many times this requires the removal of old supporting structures and/or leaving of the old supporting structures in place. Conventional supporting structures are not, generally, removable or adaptable to new equipment or technology. Thus, the old conventional supporting structure have to be removed which means removing pieces of roof or tiles and removing structures that have been nailed or bolted to the roof joists. This removal of conventional supporting structures further weakens the supporting structures.

Alternatively, these conventional supporting structures can be left protruding through the roof. Unfortunately, this is also a poor choice because over time the conventional supporting structures will generally age and rust. Moreover, these protruding conventional supporting structures provide a place for the roof to lead. Additionally, having these protruding conventional supports are unsightly and not aesthetically pleasing. Because conventional support for these structural projects tie directly into the joists of the roof below the sub-roof, the removal old supports suffer from the same disadvantages and problems identified previous.

In some cases, there is a desire to have an antenna or a structural device outside of a dwelling but, there is no access to a roof. However, in many of those cases, there is a balcony with a fence restraint opening on the outside. There have been many attempts, in the past, to utilize this potential access to the outside such as binding the structural device with rope, binding with binge cords, wielding, and the like. Unfortunately, all these attempts have proved to be not effective and have a high failure rate. Moreover, when conventional methods and securing devices fail, typically, a catastrophic failure occurs to both the structural device that is being attempted to be secured as well as to the structural supporting means such as the railing or fence of a balcony. Clearly, the conventional methods and articles, both past and present, do not handle or capable of handling the securing of other structures to them.

It can be readily seen that the past and present methods, systems, and articles of securing structures to roofs and to fragile substrates have severe limitations and problems. Also, it is evident that the conventional fabrication methods, systems, and articles of securing structures are not only complex and expensive, but also not adaptable to high volume manufacturing. Therefore, an article, design, system, and method for assembly of thermoelectric devices and modules that is cost effective, simplistic, and manufacturability in a high volume manufacturing setting is highly desirable.

SUMMARY OF THE INVENTION

Briefly stated and in various representative aspects, the present invention provides an article and method for making a non-penetrating securing device and a non-penetrating system for securing structures on fragile substrates is provided. A first element having a first hook. The first hook having a first portion, a second portion, third portion, and a fourth portion. The first, second, and third portion joined such that the second portion is perpendicular to the first and third portion at ends of the first and third portions and where the first and third portions are reasonably parallel to each other. The fourth portion is joined to the other end of the third portion such that the fourth portion is perpendicular to the third portion and reasonably parallel to the second portion. A second element having a fifth portion and a sixth portion and a second hook. The second hook having an eight portion, seventh portion, and sixth portion, wherein the eighth portion, seventh portion, and sixth portion are joined such that seventh portion is perpendicular to the sixth portion and the eighth portions and wherein the eighth portion is reasonably parallel to the sixth portion. A tension device located between the fourth portion and the fifth portion so as to provide a capability to draw the fourth portion and the fifth portion together.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWING

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent to skilled artisans in light of certain exemplary embodiments recited in the Detailed Description, wherein:

Figure 1:
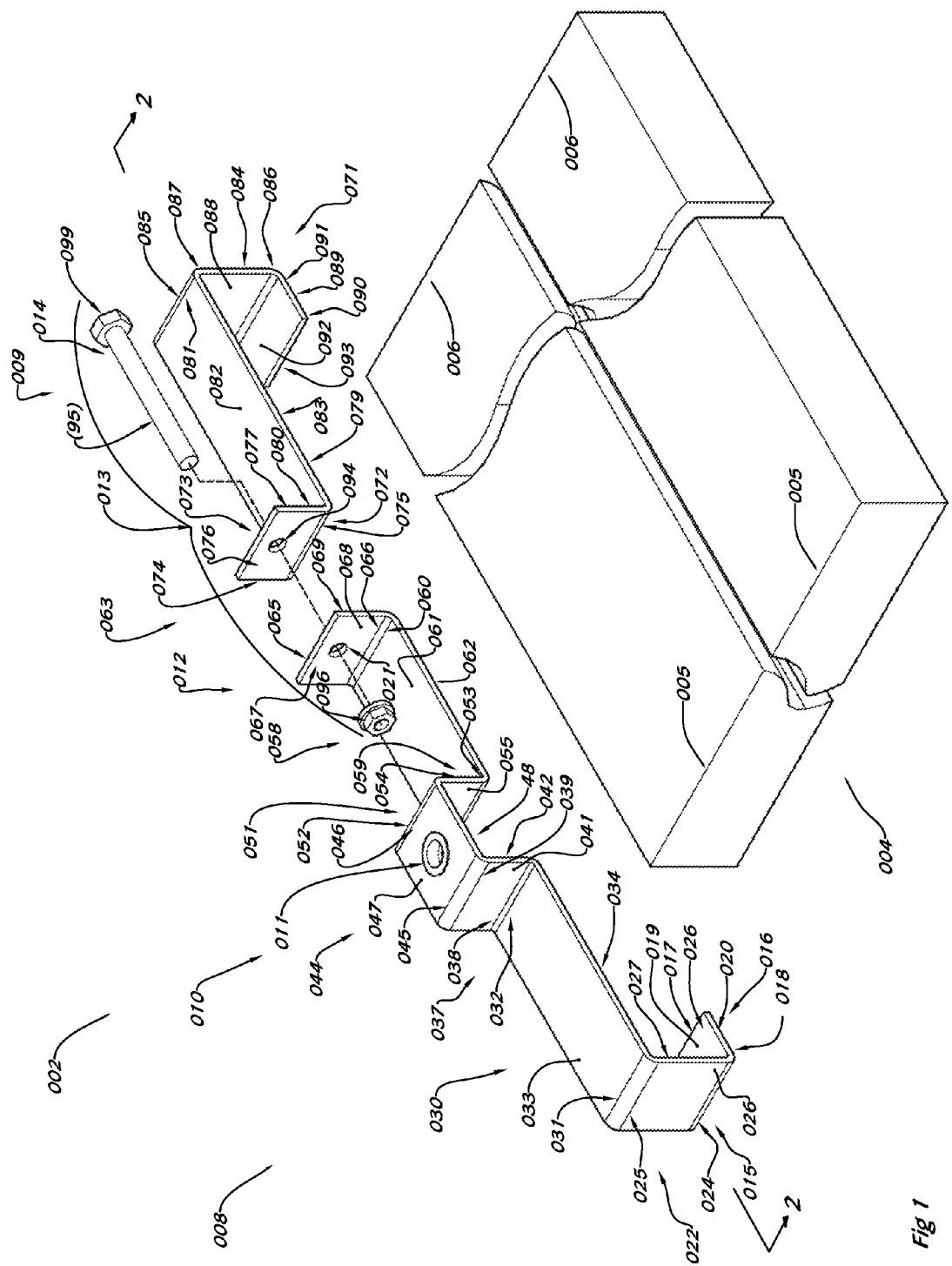
FIG. 1 is a greatly simplified perspective exploded illustration of a non-penetrating securing device with a clamping substrate.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used inter alia for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described.

DETAILED DESCRIPTION OF THE DRAWINGS

The following descriptions are of exemplary embodiments of the invention and the inventors' conceptions of the best mode and are not intended to limit the scope, applicability or configuration of the invention in any way. Rather the following Description intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely a system, a device, and method for making same by providing a non-penetrating securing device, use, and method of making suitably adapted for securing structures to sensitive and fragile substrates is presented as a specific enabling disclosure that may be readily generalized by skilled artisans to any application of the disclosed system and method in accordance with various embodiments of the present invention.

Before addressing details of the drawing described below, some terms are defined and/or clarified.

The term "clamping substrate" is intended to mean any suitable substrate having a length, a width, and a thickness. Typically, the clamping substrate is a roofing tile made of any suitable material such as, but not limited to, concrete, slate, clay, or the like. Additionally, clamping substrate can be any fenestrated railed system such as, but not limited to, a solid or tubular railed fence, or the like.

The term "mounting technology" is intended to mean any suitable method, technique, process, devices for attaching and holding two objects together such as, but not limited to, a bolt(s) and a nut(s), screws, adhesives, riveting, pop riveting, tying, or the like.

The term "composite materials" is intended to mean any suitable mixture of materials, layered materials, alloyed materials, or the like such as, but not limited to, a metal matrix composite wherein the metal matrix composite is made of at least two constituents wherein one constituent is a metal and the other constituent can be either another metal or another material such as, but not limited to, aluminum (Al), magnesium (Mg), cobalt (Co), cobalt (Co)-nickel (Ni), and and/or titanium (Ti). In another example, carbon fibers can also be used with Aluminum (Al), cobalt (Co)-nickel (Ni), cobalt (Co), magnesium (Mg), titanium (Ti), and the like. Also, carbon fiber composite materials can also be used and offer a wide variety of composite materials. By way of example only, carbon fiber materials can be made of carbon fibers that are combined with any suitable type of resin. These carbon-fiber material can be reinforced either by layers or embedding structural materials such as other fibers, plastics, nylon, polyesters, vinyl esters, other fibers such as aramid, eg, Kevlar, Twaro aluminum, or glass fibers, and/or carbon fibers and/or nano-materials such as carbon nano-materials such as carbon nano-tubes, and the like.

The term "metal" is intended to mean and suitable metal material, alloy material, or metal layered material that has sufficient strength such that when used as elements in the non-penetrating securing device, the non-penetrating securing device will be held in place.

The term "steel" is intended to mean any suitable iron composition or alloy wherein any suitable additive or additives can be added to improve the characteristics of the steel such as, but not limited to, hardness, tensile strength, corrosion resistance, electrical and heat conductivity, ductility, malleability, and the like. By way of example only typical additives used to make steel include, but are not limited to carbon (C), Manganese (Mg), Phosphorus (Ph), Sulfur (S), Silicon (S), and traces of oxygen (O), Nitrogen (N), aluminium (Al), Manganese (Mg), nickel (Ni), chromium (Cr), molybdenum (M), boron (B), titanium (Ti), vanadium (V), and Niobium (Nb), and the like.

The term "refractory metal" is intended to mean a class of metals and alloys that are extraordinarily resistant to heat and wear. Typically, refractory metals include metals from the fifth period and from the sixth period of the periodic chart such as, but not limited to, niobium (Nb), molybdenum (Mo), tantalum (Ta), tungsten (W), and rhenium (Re). However, other refractory metals are also part of the list that will satisfy the goal of being extraordinarily resistant to heat and wear. These metals are Titanium (Ti), Vanadium (V), Chromium (Cr), Zirconium (Zr), Hafnium (Hf), Rubidium (Ru), Rhenium (Ru), Osmium (Os), and Iranium (Ir). Additionally, these refractory metals can be alloyed with each other as well as with iron and with steel to make a suitable alloyed material. Additionally, it should be understood that nickel (Ni) by itself and also as part of an alloy material can be used to make suitable metal material.

Figure 2:
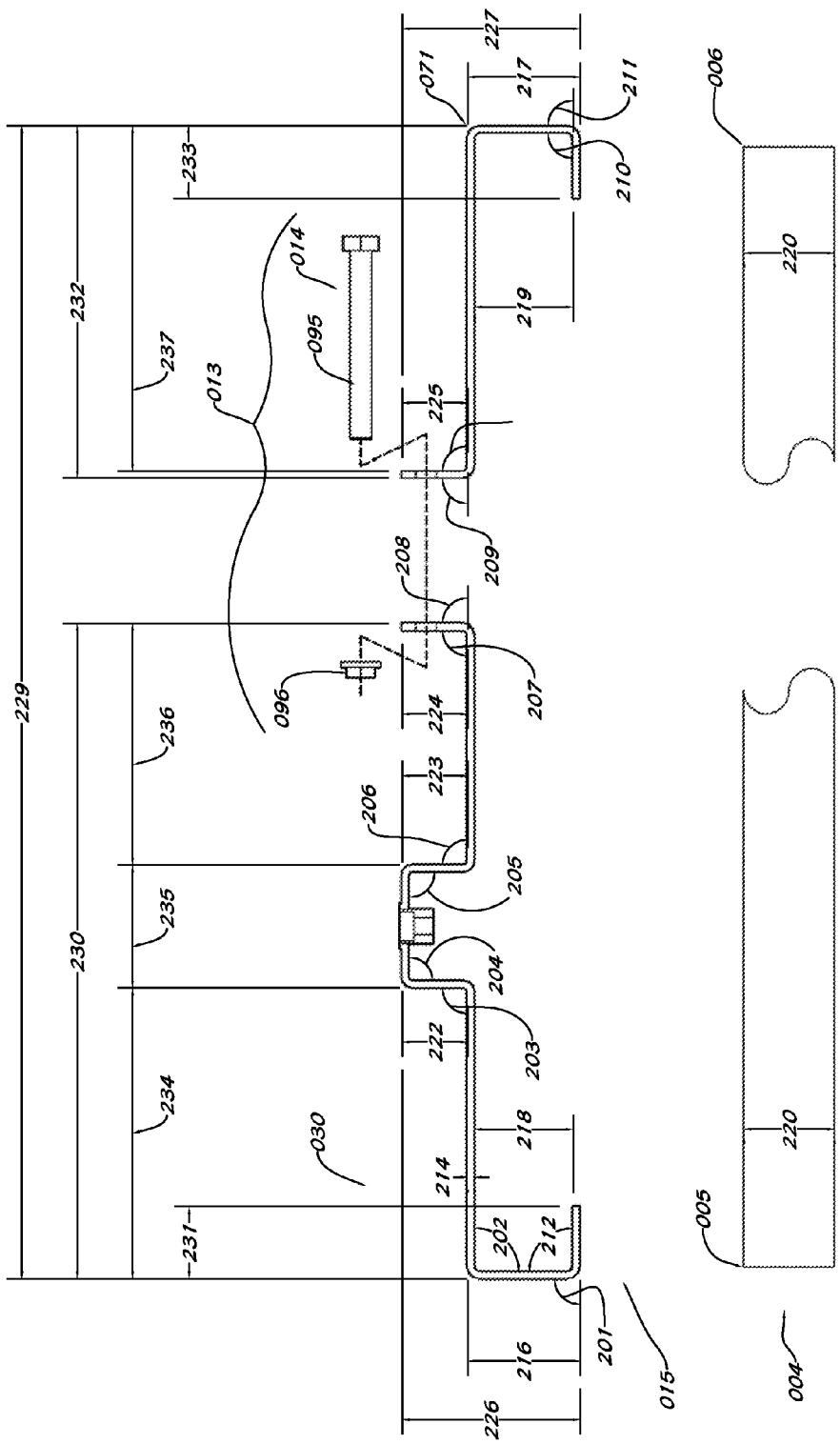
FIG. 2 is a greatly simplified sectional illustration of a non-penetrating securing device wherein the section is taken though section 2-2 of the exploded non-penetrating securing device as shown in FIG. 1.
Figure 3:
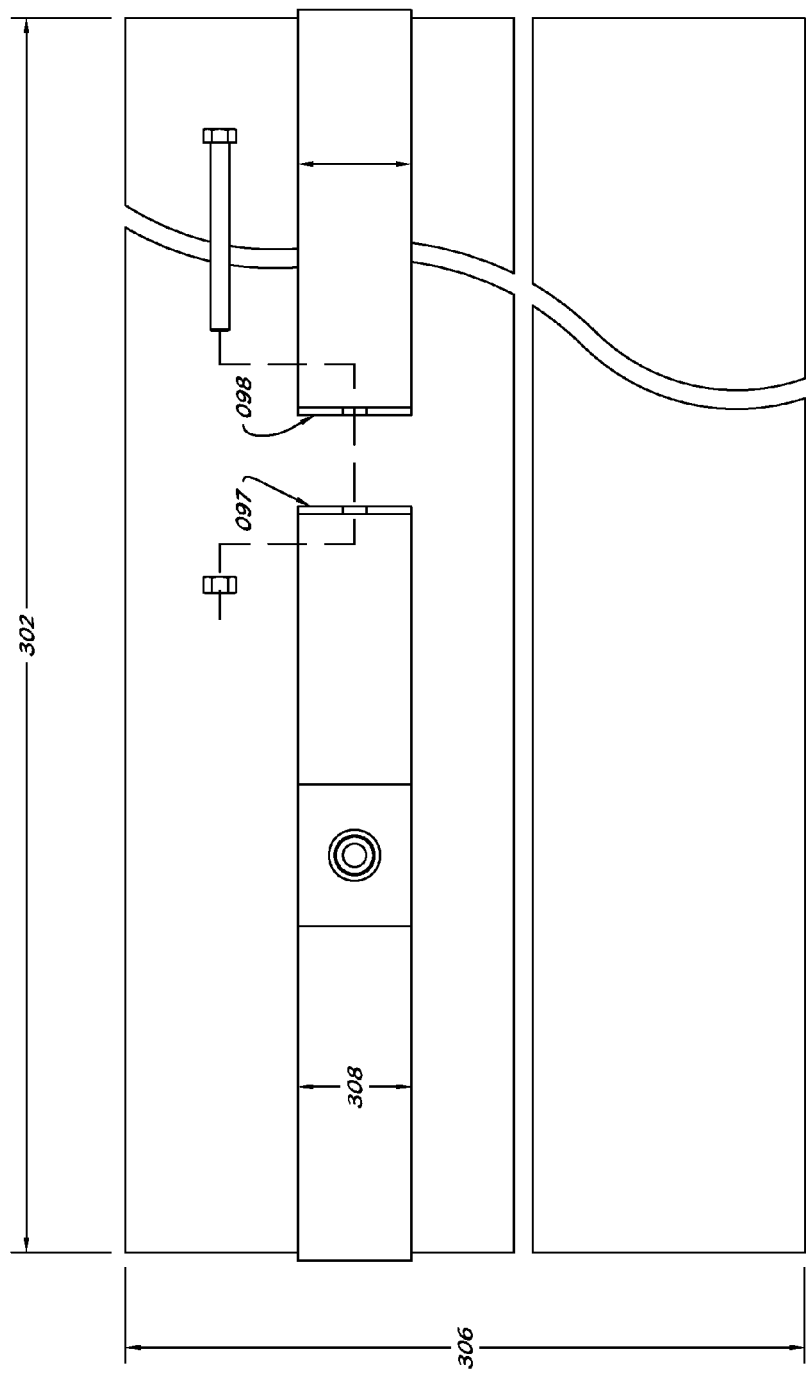
FIG. 3 is a greatly simplified top plan illustration of non-penetrating securing device as shown in FIG. 1.
Figure 4:
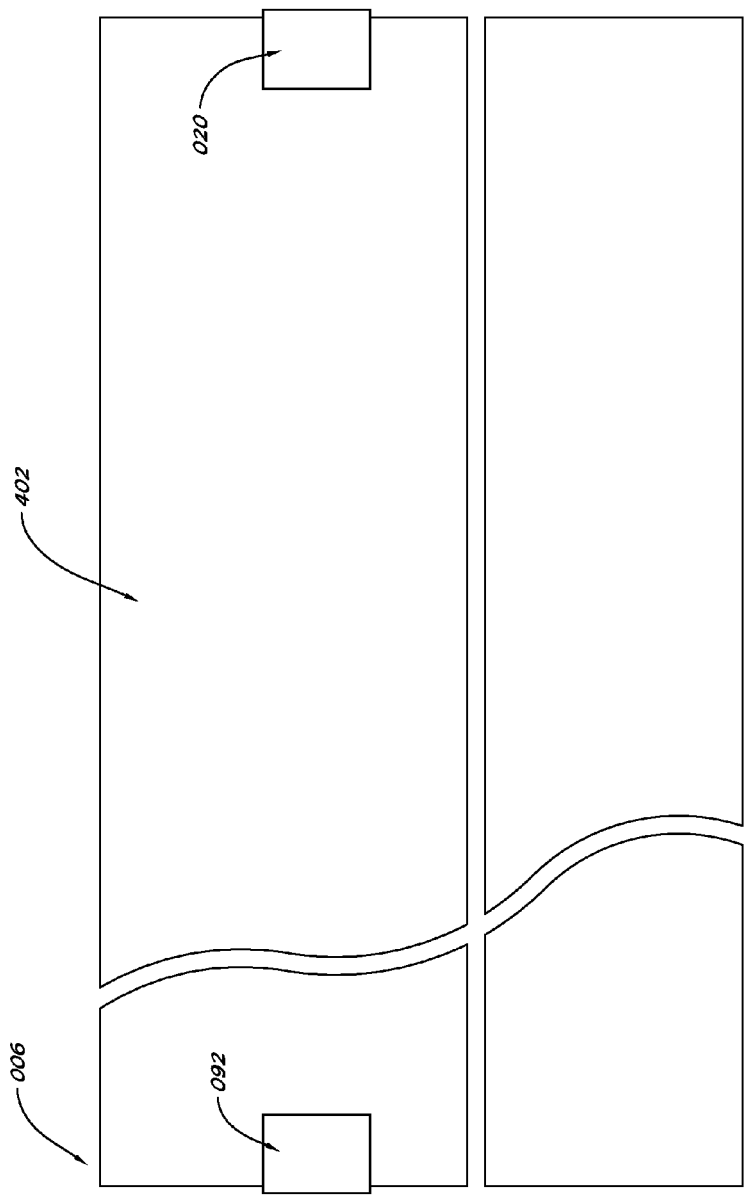
FIG. 4 is a greatly simplified bottom plan illustration of the exploded non-penetrating securing device as shown in FIG. 1.

Referring now to FIGS. 1-4, FIG. 1 is a greatly simplified perspective exploded illustration of a non-penetrating securing device 002 with elements 008 and 009, a mounting device 011, a compression device 013, and a clamping substrate 004 having ends 005 and 006; FIG. 2 is a greatly simplified sectional exploded illustration of non-penetrating securing device 002 wherein a section is taken though section line 2-2 of the non-penetrating securing device 002 as shown in FIG. 1; FIG. 3 is a greatly simplified top plan view of non-penetrating securing device 002 as shown in FIG. 1; and FIG. 4 is a greatly simplified bottom plan view of the exploded non-penetrating securing device 002 as shown in FIG. 1.

Generally, element 008 includes a hook region 015 which further includes portions 016, 022, and 030, a mounting region 010 which includes portions 037, 044, and 051, a portion 058, and a flange region 012 having a portion 065. Portion 016 includes ends 017 and 018, surfaces 019 and 020, portion 022 having ends 024 and 025, surfaces 026 and 027, and a portion 030 having ends 031 and 032, and surfaces 033 and 034. Mounting region 010 includes portion 037 having surface 041 and 042 with ends 038 and 039, a portion 044 having surfaces 047 and 048 ends 045 and 046, and a portion 051 having ends 052 and 053 and surfaces 054 and 055. Portion 058 includes ends 059 and 060 and surfaces 061 and 062. Range region 012 having a portion 065 with ends 066 and 067, and surfaces 068 and 069. An opening 021 is positioned in portion 065 that communicates from surface 068 to surface 069.

Additionally, and as shown in FIG. 1, element 008 is formed such that end 018 of portion 016 is joined to end 024 of portion 022. Typically, end 025 of portion 022 is joined to end 031 of portion 030. End 032 of portion 030 is joined to end 038 of portion 037. End 039 of portion 037 is joined to end 045 of portion 044. End 046 of portion 044 is joined to end 052 of portion 051. End 053 of portion 051 is joined to end 066 of portion 065.

Generally, element 009 includes a hook region 071 which further includes portions 079, 084, and 089 and a flange region 063 having a portion 073. Portion 079 includes surfaces 082 and 083 with ends 080 and 081; portion 084 includes surfaces 087 and 088 with ends 085 and 086; portion 089 includes surfaces 092 and 093 with ends 090 and 091; and a flange region 063 having a portion 073 having surfaces 076 and 077 with ends 074 and 075. An opening 094 is positioned in portion 073 that communicates from surface 076 to surface 077.

Generally, element 009 is formed such that end 075 of portion 073 is joined to end 080 of portion 079. End 81 of portion 079 is joined to end 085 of portion 84. End 086 of portion 084 is joined to end 090 of portion 089.

Compressive device 013 can be any suitable compressive device that will move element 008 and element 009 together such as, but not limited to, a mechanical compressive device such as, but not limited to, a bolt 014 and a nut 096, a compressive spring, a hydraulic or pneumatic compression device, a clamping device, or the like. As shown in FIG. 1, with threaded shaft 095 of bolt 014 being positioned such that threaded shaft 095 passes though both openings 021 and 094 such that when nut 096 is tightened, the distance between flange regions 012 and 063 become the distance between hook regions 015 and 071 becomes less as well, thereby grasping clamping substrate 004 with greater force.

As shown in FIG. 1, clamping substrate 004 having ends 005 and 006 is shown subdivided into for sections so as to indicate that clamping substrate 004 can be any suitable length and width and/or any variation thereof. It should be understood that clamping substrate 004 can also be of any suitable thickness, Length, width, and thickness of clamping substrate 004 are application specific. Depending upon the length, width, and thickness of clamping substrate 004 dimensionality of non-penetrating securing device 002 can be calculated, adjusted and made to any specific length, width, and thickness. However, it should be understood that in many circumstance standard dimensions can be used. Generally and as shown in FIG. 1, hook region 015 is placed around end 005 of clamping substrate 004 and hook region 071 is placed around end 006 of clamping substrate 004. Threaded shaft 095 of bolt 014 is passed though openings 094 and 021. Nut 096 is threaded on threaded shaft 095, thereby pulling flange regions 012 and 063 together and subsequently pulling hook regions 015 and 071 together to firmly grasp clamping substrate 004.

It should be further understood that clamping substrate 004 can be made of any suitable manufactured or natural occurring substrate that is either open or closed or any combination thereof. By way of example only, an open substrate can be a rail structure wherein the rail structure includes a plurality of regularly and/or irregularly spaced apart rails such that hook regions 015 and 071 can be positioned so that hook region 015 and hook region 071 are capable of grasping an individual rail such that compression device 013 can pull flange regions 063 and 012 can be pulled towards each other and subsequently pulling hook regions 015 and 071 closer together. It should be understood that by pulling hook regions 015 and 071 closer together the strength of the grasp of the grasp of the hook regions 015 and 071 around the rails increases, thereby increasing the ability to support heavier loads.

Generally, elements 008 and 009, mounting device 10, and compression device 013 can be made of any suitable material or combination of materials such as, but not limited to, metal materials, alloys of metal materials, combinations of metal materials, polymer materials, combinations of metal and polymer materials, or the like. For instance, elements 008 and 009, mounting device 010, and compression device 013 could be made of any suitable metals such as, but not limited to, iron (Fe), aluminum (Al), copper (Cu), any suitable alloys such as, but not limited to, any kind of brass alloy material, any kind of bronze alloy materials, any kind of steel alloy materials, or the like. Further, it should be understood that elements 008 and 009, mounting device 010, and compression device 013 can be made of any suitable refractory metal materials, alloys, or the like.

Additionally, elements 008 and 009, mounting device 10, and compression device 013 can also be made by any suitable polymer, plastic, or resin material such as, but not limited to, acetals, nylons, phonolics, polycarbonates, epoxies, polyethylene, polyimides, polyurethanes, ultrahigh-molecular-weight polyurethanes, ultrahigh-molecular-weight polyethylene, fiberglass materials, carbon fiber materials, nano-composite materials, and the like. Also, it should be understood that elements 008 and 009, mounting device 010, and compression device 013 can be made of any combination of suitable materials such as, but not limited to, metal materials, alloys of metal materials, a combinations of metal materials, polymer materials, combinations of metal and polymer materials.

Referring now to FIGS. 1-4, elements 008 and 009 and mounting device 011 can be made by any suitable method or technique such as, but not limited to, milling, molding, bending, or the like. By way of example only and in the case of elements 008 and 009, raw material is generally available as flat stock in relatively large sheets. The relatively large sheets of flat stock is generally cut into smaller flat rectangular shaped strips by any suitable means such as, but not limited to, sawing, laser ablation, plasma torch cuffing, shearing, or the like. Each individual flat rectangular shaped strip has a total length, a total width, and a total thickness. (See FIG. 2) It should be understood that two flat rectangular shaped strips are used to make non-penetrating securing device 002: one flat rectangular shaped strip for making element 008 and one flat rectangular shaped strip for making element 009.

As shown in FIGS. 1 and 2, portions 022, 037, 051, 065, 073 and 084 are joined as described previously, wherein portions 022, 037, 051, and 065, 073, and 084 are positioned approximately vertically with respect to portions 030, 058, 079, and 089 which are positioned approximately horizontally. However, as shown in FIG. 2, angles 201, 202, 203, 204, 205, 206, 207, 208, 209, 210, 211, 212 can be set to any suitable angle range or individual angle as any specific application might require such as, but not limited a range of 10.0 degrees to 170.0 degrees. Generally, however, angles 201, 202, 203, 204, 205, 206, 207, 208, 209, 210, 211, 212 can range from 45.0 degrees to 135.0 degrees, with a preferred range between 30.0 degrees to 105.0 degrees. It should be further understood that angles 201, 202, 203, 204, 205, 206, 207, 208, 209, 210, 211, 212 can be individually adjusted to any suitable angle.

As shown in FIG. 2, the total length of the flat rectangular shaped strip used for making element 008 is the summation of lengths 231, 234, 235, and 236; and thicknesses 216, 222, 223, and 224. As also shown in FIG. 2 the total length of the other flat rectangular shaped strip used for making element 009 is the summation of lengths 237 and 233; and thicknesses 225 and 217. While the total length of the 3-D shaped strips (shown in FIG. 2 as being formed into elements 008 and 009) can be made to any suitable length depending upon the specific application typically length can range from to 5.0 centimeters to 1.0 meter, with a median length ranging from to 20.0 centimeters 0.5 meter, with an optimum length ranging from to 30 centimeters to 40.0 centimeters It should be understood that element 008 and 009 can be made with different total lengths, thereby allowing design flexibility of spacing of the various portions 016, 022, 030, 037, 044, 051, 058, 065, 073, 079, 084, 089 of elements 008 and 009.

Additionally, as shown in FIGS. 1, 2, 3, and 4, elements 008 and 009 can be made having any suitable thicknesses 214 and 215, respectively. Thicknesses 214 and 215 of elements 008 and 009 are dependant upon at least several factors such as design considerations, material composition, stresses that non-penetrating securing device 002 will endure during use, a width 308 (Shown in FIG. 3), and the like. Generally, thicknesses 214 and 215 can range from 2.0 millimeters to 6.0 centimeters, with median thickness ranging from 3.0 millimeters to 4.0 centimeters, and nominal thickness ranging from 5.0 millimeters to 1.5 centimeters. It should be understood that thicknesses 214 and 215 can be different thicknesses depending upon the specific application. It should also be understood that different locations on elements 008 and 009 can have different thickness so as to accommodate different stresses on the specific materials of choice. By way of example only, hook regions 015 and 071 maybe thicker (ten to twenty percent) then portion 030. In yet another example, flanges 012 and 063 may be thicker (ten to twenty percent) then portion 030.

Referring now to FIG. 2, elements 008 and 009 have thicknesses 226 and 227 which illustrate a total thickness of non-penetrating securing device 002. Thicknesses 226 and 227 can have wide range of thicknesses depending upon the specific application. Typically, thicknesses 226 and 227 can range from five (5.0) millimeters) to five (5.0) centimeters, with a nominal range between ten (10.0) millimeters to four (4.0) centimeters, and with a specific range between fifteen (15.0) millimeters to three point five (3.5) centimeters and.

Thicknesses 216 and 217 illustrate the thickness of non-penetrating securing device between surfaces 033 and 020 and between surfaces 082 and 093. While it should be understood that thicknesses 216 and 217 can have a wide range of thicknesses and made to have any suitable thickness, thicknesses 216 and 217, generally, range from 0.5 centimeters to 10.0 centimeters, with a nominal range from 2.0 centimeters to 8.0 centimeters, and a specific range from 1.5 centimeters to 5.0 centimeters. It should also be understood that thicknesses 216 and 217 can vary between each other.

Thickness 218 and 219 illustrate thicknesses between surfaces 017 and 034 of element 008 and 009, respectively. Thicknesses 218 and 219 determine the widest possible thickness of clamping substrate 004 that hook regions 015 and 071 are capable of accepting. While it should be understood that thicknesses 218 and 219 can have a wide range of thickness and can be made to any suitable thickness desired depending upon the specific application. By way of example only, when thickness 220 of clamping substrate 004 is 2.0 centimeters and when thickness 221 of clamping substrate 004 is 1.0 centimeter, thickness 218 and 219 can be made to have comparable thickness minus five (10%) percent of thickness 220 so as to ensure a good fit. Additionally, it should be understood that by allowing dynamic thickness variation from hook region 015 to hook region 071 allows for greater flexibility of design and application.

Additionally, thicknesses 222, 223, 224, and 225 illustrate thicknesses between surfaces 033 and 047; surfaces 047 and 061; surfaces 061 and the top of flange; surfaces and surface 82. It should be understood that thicknesses 222, 223, 224, and 225 are independent and can be made to any suitable thickness, thereby allowing independent thickness variably. Moreover, it should further be understood that thicknesses 222, 223, 224, and 225 do not have to be uniform across widths 308 and 310 of either or both of elements 008 and 009, respectively, thereby allowing thickness variation from end 045 to end 046 of surface 047 thickness from side 312 side 314. Thus, surface 047 can be adjusted in terms of total thickness and independently controlled at each of its corners. While it should be understood that thicknesses 218 and 219 can have a wide range of thickness and made to any suitable thickness desired depending upon the specific application. By way of example only, when thickness 220 is 2.0 centimeters and when thickness 221 is 1.0 centimeter, thickness 218 and 219 can be made to have comparable thickness minus percent of thickness 220 so as to ensure a good fit. R Referring now to FIG. 3, FIG. 3 is a greatly simplified top plan view of non-penetrating securing device 002 as shown in FIG. 1 wherein clamping substrate 002 is broken apart so as to indicate that clamping substrate 002 can have any suitable width 306 and length 302. Also, widths 308 and 310 of elements 008 and 009 of non-penetrating securing device 002, respectively, can be made to any suitable width. It should be understood that the widths 308 and 310 can be made to any suitable width. Moreover, it should be understood that width 308 and 310 are independent with one width being able to be smaller or larger then the other. As shown in FIG. 3, non-penetrating securing device 002 is mounted onto clamping substrate 004 by ends 005 and 006.

Referring now to FIG. 4, FIG. 4 is a greatly simplified bottom plan view of non-penetrating securing device 002 as shown in FIG. 1, wherein clamping substrate 002 is broken apart so as to indicate that clamping substrate 002 can be made to any suitable size. As shown in FIG. 4, surfaces 093 and 020 of portions 016 and 089 are exposed with hook regions 071 and 015, respectively, grasping clamping substrate 004 at ends 006 and 005, respectively.

It should be understood that non-penetrating securing device 002 can be made by any method or technology desired. Selection of the technology used for making non-penetrating securing device 002 is application specific and different technologies and/or methods have both advantages and disadvantages.

By way of example only, using cut metal stock to make elements 008 and 009 are generated by bending the cut flat stock appropriately. Any suitable means such as, but not limited to, a bending brake, a press, or the like to form the appropriate shapes.

By way of example only, elements 008 and 009 are made from flat stock. The flat stock is cut having elements 008 and 009 starts as two pieces of flat stock. The flat stock is then cut to into strips having appropriate widths 308 and 310 has shown in FIG. 3) and appropriate total lengths 230 and 232 when completed (as shown in FIG. 2.) In the case of element 008, the flat stock strip can be fitted with mounting device 011 (as discussed below) and then subsequently bent at the appropriate positions to begin to form hook region 015, wherein surface 019 of portion 016 is opposed to surface 034 of portion 030 are opposed to each other. However, it should be understood that installation of mounting device 011 could be delayed required bending of the cut stock is complemented.

It should be understood that mounting device 011 can be mounted, installed or the like at any suitable time during the fabrication process.

Typically, element 008 is started by bending at an end 18 so that portion 022 and portion 016 are at an angle 212. Another bend is made at ends 025 and 031 of portions 022 and 030, respectively, thereby forming hook region 015. Another bend is made at ends 032 and 038 to form angle 203. Another bend is made at ends 038 and 045 of portions 037 and 044 to generate angle 204 and positioning portion 037 approximately perpendicular to portion 030 at joining of ends 032 and 038. A bend is made at ends 039 and 045 of portions 037 and 044 to make angle 204, thereby making portion 044 at a different plane but approximately parallel with portion 016. A bend is then made at ends 046 and 052 to make angle 205 and positioning portion 051 in approximately parallel vertical planes with portions 022 and 037. A bend is then made at ends 053 and 059 of portions 051 and 058, respectively, to form angle 206 resulting in portion 058 being positioned in an approximately parallel with portions 030 and 016. A bend is then made at ends 060 and 066 of portions 058 and 065, respectively, resulting in portion 065 being perpendicular to portion 058 and in a similar vertical plan a portions 022, 037, and 051.

Typically, element 009 is started by bending at end 091 so that portion 084 and portion 089 are at an angle 210. Another bend is made at ends 081 and 085 to form angle 238 of portions 079 and 084, thereby making portion 084 approximately perpendicular to portion 089. Another bend is made at ends 085 and 081 to form angle 283 with portions 079 and 084, thereby positioning portion 079 approximately parallel to portion 089, thereby forming hook region 071. Another bend is made at ends 072 and 080, thereby forming portion 073 of flange region 063.

After elements 008 and 009 have been formed, elements 008 and 009 are cleaned to remove all contamination such as oil, metal burrs, and the like. Once elements 008 and 009 are cleaned, elements 008 and 009 are finished with a coating such as, but not limited to, painting, powder coating, or the like. With elements 008 and 008 completed, elements 008 and 009 can be used in conjunction with other structures to support, hold, and secure a variety of objects that is not capable of being supported, held, or secured with conventional technology.

Generally, compression device 013 is operably connected to flange regions 012 and 063 so as to draw flange regions 012 and 063 closer together so that a compression force is developed between hook regions 015 and 071 which applies a clamping pressure around clamping substrate 004. While any suitable compression device could be used such as, but not limited to, a come along system, a bolt and nut system, (more ideas), or the like.

By way of example only and as shown in FIGS. 1-4, a bolt and nut system is illustrated. As shown in FIG. 1, portions 065 and 073 have openings 21 and 94. With a bolt 014 having a head 099 and threaded shaft 095 with threads thereon, the threaded shaft 095 can placed though openings 094 and 021. A nut 096 can then threaded onto threaded shaft 095. As nut 096 is treaded, head 099

Figure 5:
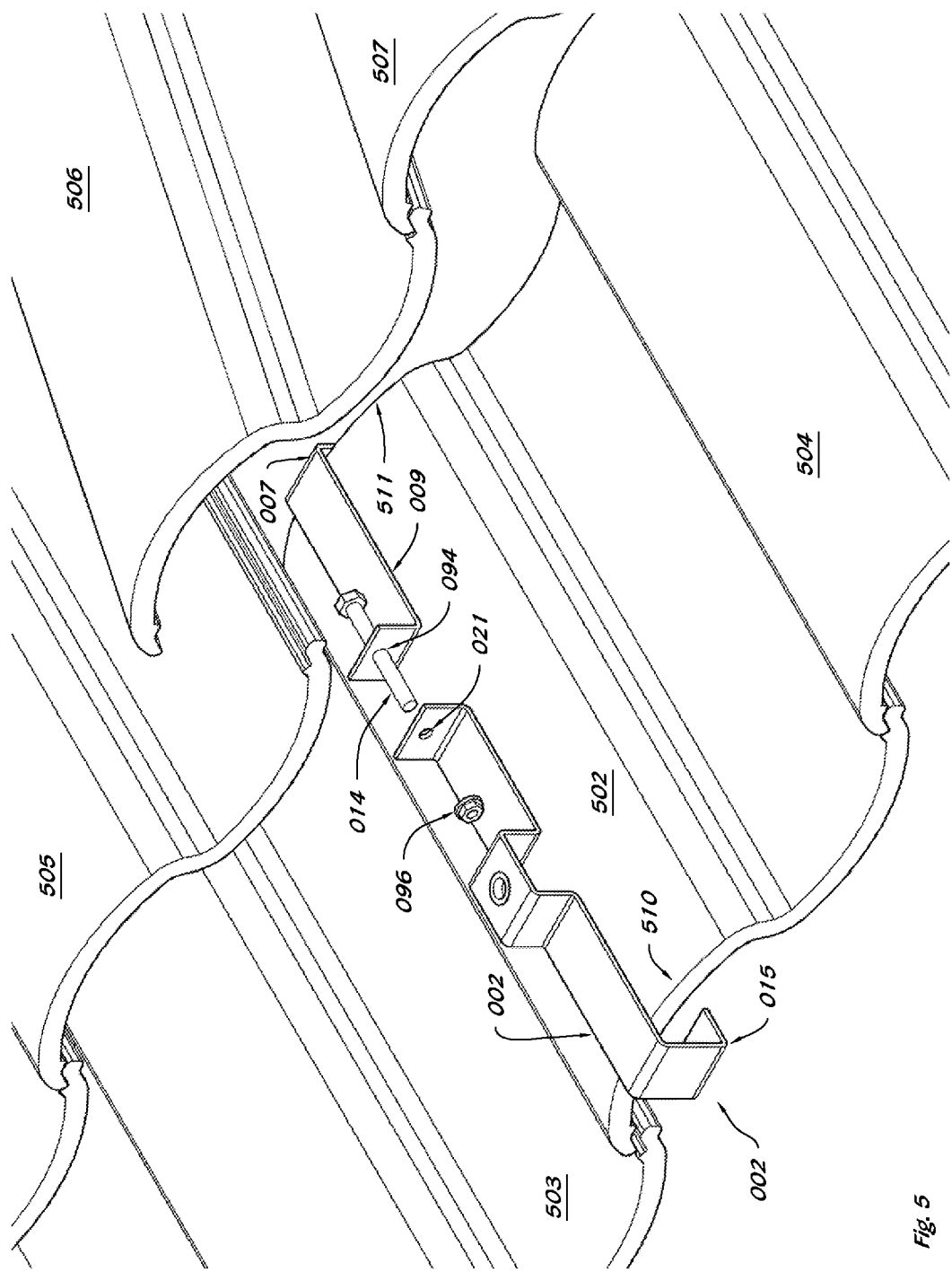
FIG. 5 is a greatly simplified perspective illustration of a non-penetrating securing device being installed on a roofing tile.

Referring now to FIG. 5, FIG. 5 is a greatly simplified perspective view of a non-penetrating securing device 002 being installed on roofing the 502. As illustrated in FIG. 5, roofing tiles 503 and 504 are shown as being on either side of roofing tile 502 with roofing tiles 505, 506, 507 being elevated to expose roofing tile 502 and non-penetrating securing device 002. It should be understood that elevation of roofing tile 506 and/or 507 does not harm the tiles 506 and/or 507. It should be further understood that none of roof files 502, 503, 504, 506, and 507 are damaged. Additionally, the sub-roof elements are not disturbed or damaged.

Once roofing tile 502 and ends 510 and 511 are exposed, hook regions 015 and 071 of non-penetrating securing device 002 are placed on ends 510 and 511 of roofing tile 502, as shown in FIG. 5. Elements 008 and 009 are then positioned properly and threaded shaft 095 of bolt 014 is pushed though openings 094 and 021. Nut 096 is then threaded on shaft 095, thereby pulling elements 008 and 009 together as well as pulling hook regions 015 and 071 together, thereby putting a compressive force on ends 510 and 511 of roof tile 502 and securing the non-penetrating securing device to roof tile 502. The compressive forces are distributed though the entire roof tile 502. Because non-penetrating securing device uses the material strength of the tile in a new and unique manner, non-penetrating securing device 002 can be used to support large platforms and objects without disturbing or breaking tile 502, under layers or subroof structures.

Roof tiles 505, 506, and 507 are then lowered into their original positions, thereby resealing the roof with the original tiles and leaving roof tile 502 with non-penetrating securing device 002 affixed to roof tile 502 without damaging or weakening the roof or its sub-layers. Further, non-penetrating securing device 002 is firmly secured on roofing tile 502 without damaging the tile, the tile roof, the sub-roof systems. The installation of the non-penetrating securing device 002 can be installed with a minimum of tools and time. Thus, allowing projects that were once burdensome and damaging to be done with no burden and no damage.

Figure 6:
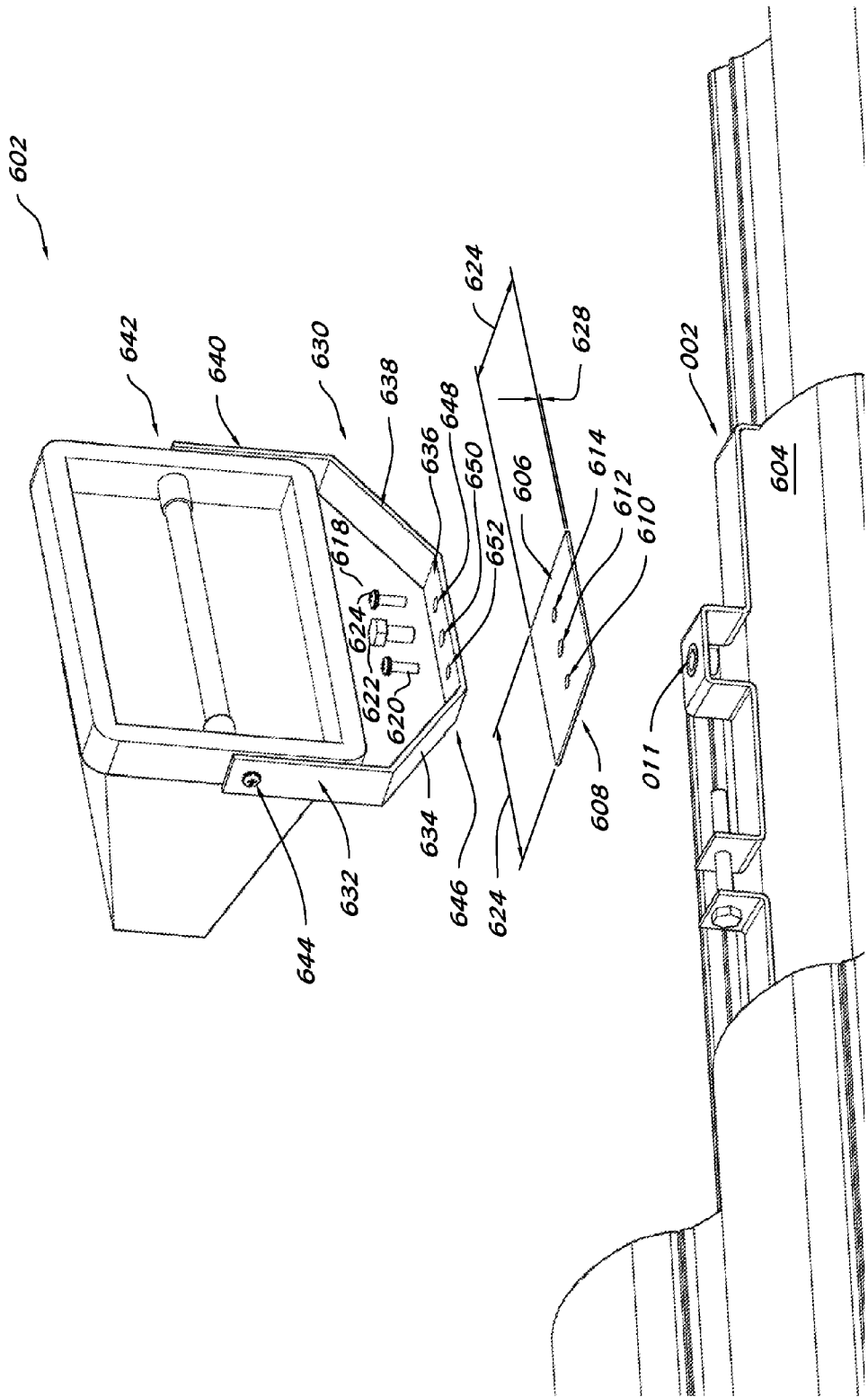
FIG. 6 is a greatly simplified perspective illustration of a non-penetrating securing device 602 installed on a roofing tile for securing a mounting device for a single device.

Referring now to FIG. 6, is a greatly simplified exploded perspective illustration of a non-penetrating securing system 002 for securing and mounting a device 601. As shown in FIG. 6, non-penetrating securing system 002 is mounted to roofing tile 603 as previously described in FIG. 5 to provide open access to mounting device 011 so as to provide a strong, secure and stable mounting structure.

Typically, a base plate 605 having a plurality of openings 608, represented by openings 610, 612, and 614, is provided so that a plurality of securing devices 618, represented by securing devices 620, 622, and 624 are capable of being attached or mounted to base plate 605.

Base plate 605 can be made of any suitable material as previously described herein and can be made by any suitable technology or method as previously described herein. Base plate 605 can be any suitable dimensions. Dimensions of base plate 605 are application specific and can have a high degree of variability. However, typically, base plate 606 has a width 624 and a length 626 that can range from 1.0 centimeter to 50.0 centimeters, with a nominal range being 2.0 centimeters to 20.0 centimeters, and an optimal range being 4.0 centimeters to 10.0 centimeters. Also, typically, base plate 605 has a thickness 628 that can range from 3.0 millimeters to 3.0 centimeters with a nominal range from 5.0 millimeters to 2.0 centimeters, and an optimal range being 7.0 millimeters to 1.0 centimeter.

The plurality of openings 608 and 447 can be made by any suitable method or techniques. The plurality of opening sizes is application specific and can have a wide range of sizes.

As shown in FIG. 6 and by way of example only, with device 602 is lamp. However, it should be understood that device 602 can be any suitable device such as a sculpture, a Christmas blow-up, a bird repelling device, or the like. Device 602 includes support bracket 630 having adjoining sections 632, 634, 636, 638, and 640 that holds lamp 602 with screws 642 and 644. Section 638 of bracket 630, as shown in FIG. 6, has been provided with the plurality of openings 646 individually identified by openings 648, 650, and 652. As can be seen securing device 622 passes though opening 650 of support bracket 630 and though opening 612 of base plate 606 and secured into mounting device 011.

Additionally, securing devices 620 and 624 pass though opening 652 and 648, respectively, and into openings 610 and 614, respectively, to secure support bracket 630 from moving. As can be seen in non-penetrating securing device 002 allow for the ability of a object to a fragile tile or substrate without breaking or destroying underlying structures and sub-structures.

Figure 7:
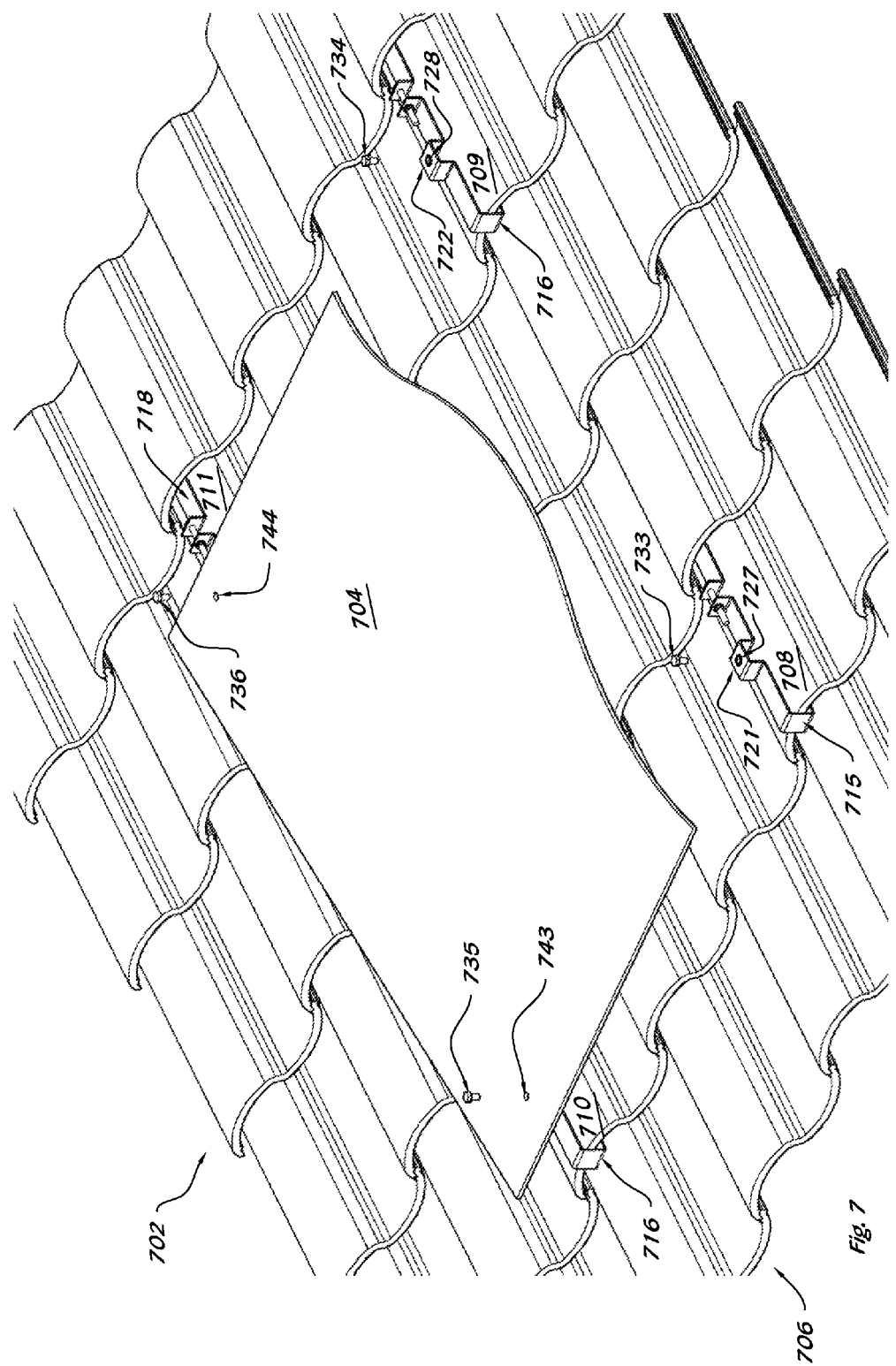
FIG. 7 is a greatly simplified perspective illustration of several a non-penetrating securing devices used to form a mounting system which can be used for securing and mounting a platform tile roof.

Referring now to FIG. 7, FIG. 7 is a greatly simplified exploded perspective illustration of a non-penetrating securing system 702 used for securing and mounting of a platform 704. As shown in FIG. 7, a plurality of roofing tiles 706 comprise the roof as set out. Of the plurality of roofing tiles 706, roofing tiles 708, 709, 710, and 711 and have been fitted with non-penetrating securing devices 715, 716, 717, and 718 having mounting regions 721, 722, 723 (not shown), and 724 (not shown), respectively.

Non-penetrating securing devices 715-718 are positioned on roofing tiles 708-711 in the form of square. However, it should understood, that any number of non-penetrating securing devices can be used and that these non-penetrating securing devices can be assembled to form any geometric patterned that is desired such as, but not limited to, a triangle, circle, oval, a rectangle, or the like. It should also be noted that by increasing the number of non-penetrating securing devices increases the force necessary to pull up or damage platform 704. This is especially important when structure 739 has a large cross sectional surface area that can act as a sail.

Moreover, mounting regions 721-724 can utilize any suitable affixing or mounting technology, such as riveting, pop-riveting, nuts and bolts, bolts, welding, or a mix there of, or the like. Platform 704 can be made of any suitable material, such as, but not limited to, metal, wood, carbon fiber, composite materials, foam, or the like. As shown in FIG. 7, platform 704 is secured to non-penetrating securing devices 715-718 by threaded bolts 733, 734, 735, and 736, that pass though openings 741 (not shown), 742 (not shown), 743, and 744, respectively. It should be understood that in order to provide a more robust and secure platform 704 securing devices 715-718 may be a mix of techniques and methods.

By way of example only and in this specific case, mounting regions 721-724 are fitted with a threaded bosses 727, 728, 729 (not shown), and 730 (not shown). Threaded bolts 733-736 are passed though openings 741-744 in platform 704 and are affixed to threaded bosses 727, 728, 729 (not shown), and 730 (not shown) of mounting regions 721-724 of non-penetrating securing device 715-718.

Figure 8:
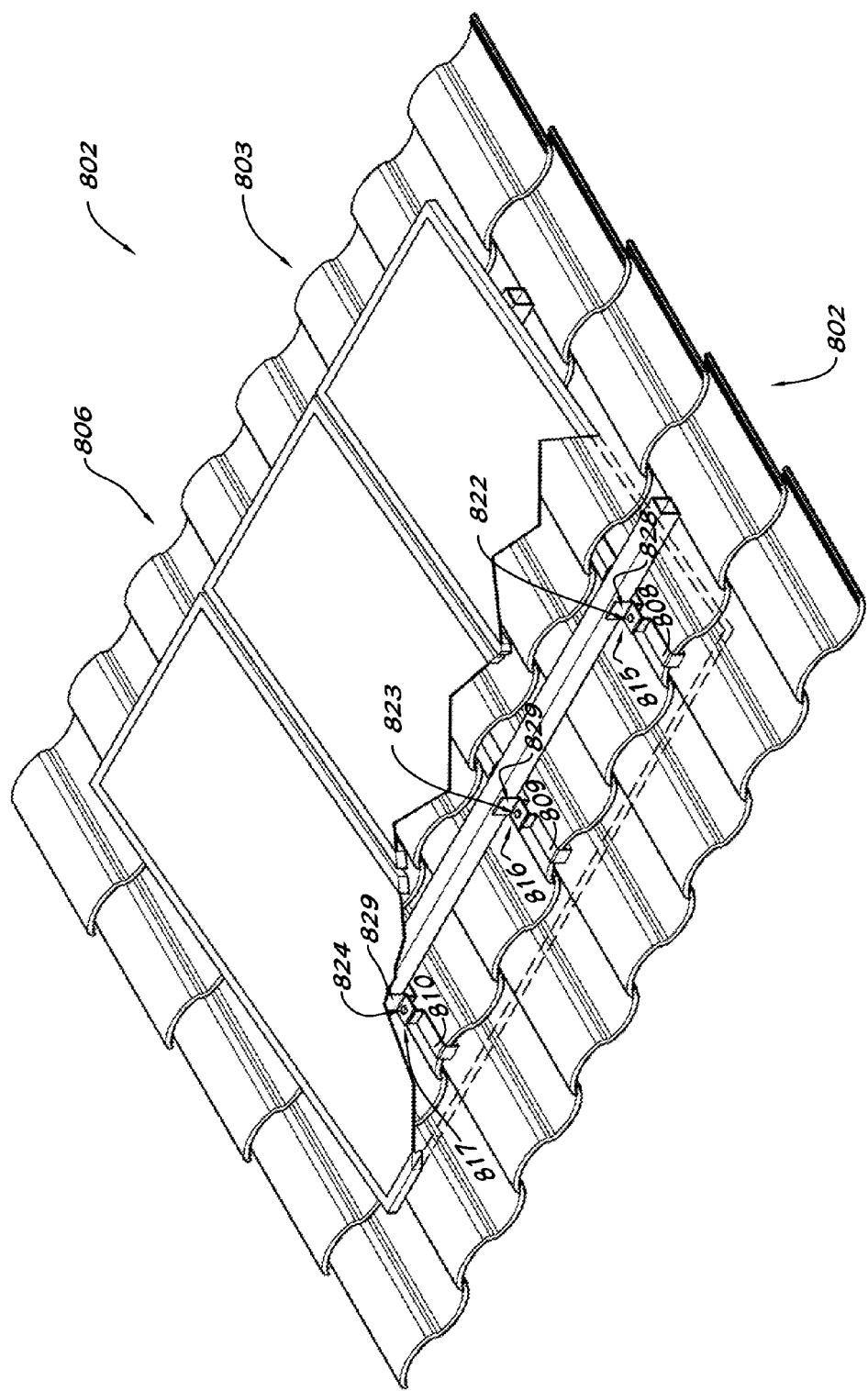
FIG. 8 is a greatly simplified perspective illustration of several non-penetrating securing devices used to form a mounting system for mounting a solar panel to a tile roof.

FIG. 8 is a greatly simplified perspective illustration of a pattern of a plurality non-penetrating securing devices 802 used to form a mounting system 804 for mounting of a plurality of solar panels 806 individually identified as solar panels 842 and 843 to a the roof 803. As shown in FIG. 8, the plurality of non-penetrating securing device 802 are individually identified as non-penetrating securing devices 808, 809, 810, 811 (not shown), 812 (not shown), and 813 (not shown), with mounting regions 815, 816, 817, 818 (not shown), 819 (not shown, and 820 (not shown), with treaded bosses 822, 823, 824, 825 (not shown), 826 (not shown), 827 (not shown). Additionally, L brackets 828, L brackets 829, L brackets 830, L brackets 831 (not shown), L bracket 832 (not shown, and L bracket 833 (not shown) are prepared. Further, square tubing 835, and 836 (not shown) are cut to length and prepared.

As shown in FIG. 8, the plurality of non-penetrating securing devices 802 are set out in a pattern across the plurality of roof tiles 801 wherein mounting regions 815-820 are exposed. L brackets 828, L brackets 829, L brackets 830, L brackets 831 (not shown), L bracket 832 (not shown, and L bracket 833 (not shown) are installed via threaded bolts into treated bosses 822, 823, 824, 825 (not shown), 826 (not shown), 827 (not shown). Installation of L brackets 828, L brackets 829, L brackets 830, L brackets 831 (not shown), L bracket 832 (not shown, and L bracket 833 (not shown) provides a flat surface onto which square tubes 838 and 839 can be attached.

Generally, square tubes 838 and 839 support the plurality of solar panels 806. Typically, the plurality of solar panels can be affixed to square tubing by bolt 846 as shown in FIG. 8.

Figure 9:
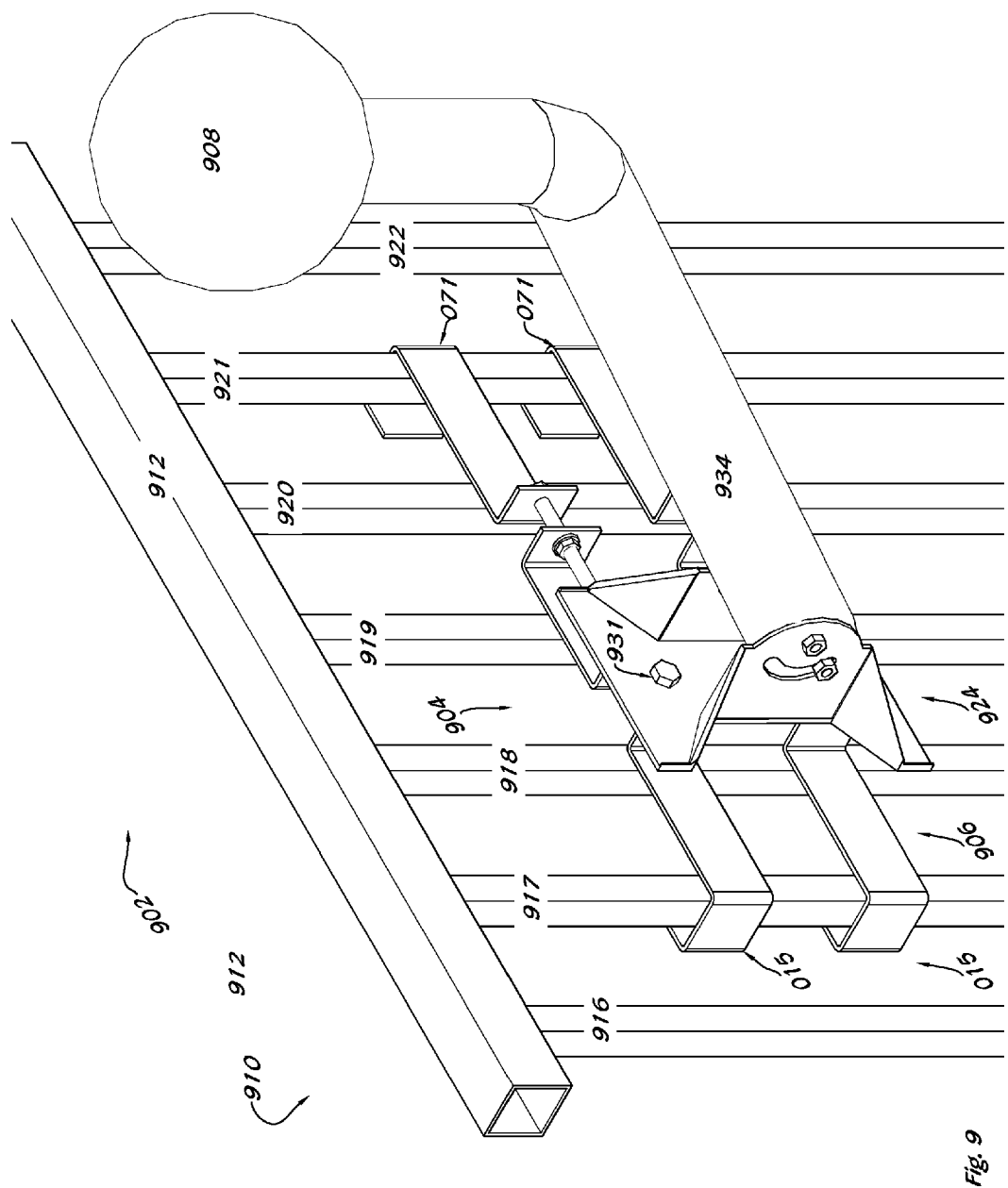
FIG. 9 is a greatly simplified perspective illustration of several non-penetrating securing devices used to form a mounting system for mounting a device to railing.

FIG. 9 is a greatly simplified perspective illustration of a non-penetrating securing system 902 wherein non-penetrating securing devices 902 and 906 are used to mount a device 908 to a railing 910.

As shown in FIG. 9, railing 910 includes a top tube 912 and a plurality of tubes 914 some of which are individually identified as tubes 916, 917, 918, 919, 920, 921, and 922 that are attached to top tube 912 and are approximately perpendicular to top tube 912. Non-penetrating securing devices 904 and 906 are mounted to railings 917 and 921 by hook regions 015 and 071. It should be understood that depending upon the application, the environment, and the size of device 908 it would be possible to only use one non-penetrating securing device. However, it should also be understood that use of more than two non-penetrating securing device go be advantageous.

Bracket 924 include plate 926 having opening 928 (not shown) and 929 (not shown) wherein threaded bolts 931 and 932 (not shown) are attached to underlying mounting regions of non-penetrating securing devices 904 and 906. Typically, the attachment from mounting regions (not shown) to threaded bolts 931 and 932 is by threaded boss mounted in the mounting regions of non-penetrating securing devices 904 and 906.

Device 908 can be any suitable device that needs to be supported such as an lamp, antenna, Christmas ornaments, or the like.

As shown in FIG. 9, bracket 924 supports arm 934 and device 908. Arm 934 can be of any suitable size and in any direction configuration desired. By being able to adjust and aim arm 934 further allows device 908 to be able to be adjusted and aimed to.

Skilled artisans will appreciate that the benefit of having increased flexibility of being able to install into a wider or greater circumstances to as to provide support for device 908.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

We claim:

1. A non-penetrating securing device comprising:
a first element having a thickness, a width, a first hook having a first end, a first portion having a second end and a third end, a second portion having a a fourth end, a fifth end, and a securing device having a sixth end and a seventh end, and a first flange having a first opening and an eighth end, the first end of the first hook coupled to the first end of the first portion, the securing device coupled to the first portion, the second portion coupled to the securing device and the flange coupled to the second portion
a second element having a second flange with a second opening, a third portion, and a second hook, the second flange coupled to the third portion, and the second hook coupled to the third portion; and
a compressive device located between the first flange and the second flange capable of moving the first flange and the second flange closer together.

2. The non-penetrating securing device as claimed in claim 1 wherein the first element is made of metal.

3. The non-penetrating securing device as claimed in claim 2 wherein the first element is made of plastic.

4. The non-penetrating securing device as claim in claim 1 wherein the first element is galvanized.

5. The non-penetrating securing device as claimed in claim 1 wherein the first element is powder coated.

6. The non-penetrating securing device as claimed in claim 4 wherein the first element is powder coated.

7. The non-penetrating securing device as claimed in claim 1 wherein the non-penetrating securing device is made of a metal.

8. The non-penetrating securing device as claimed in claim 1 wherein the thickness of the first element can range from 2.0 millimeters to 6.0 centimeters.

9. The non-penetrating securing device as claimed in claim 1 wherein the width of the first element can range from 1.0 centimeter to 50.0 centimeters.

10. The non-penetrating securing device as claimed in claim 1 further including a clamping substrate, wherein the clamping substrate is capable of being positioned between the first hook and the second hook of the non-penetrating securing device.

11. The non-penetrating securing device as claimed in claim 1 wherein the non-penetrating securing device is made of plastic.

12. A non-penetrating securing device comprising:
a first element having a first hook having a first end, a first portion having a second end and a third end, a second portion having a fourth end and a fifth end, and securing device having a sixth end and seventh end, and a first flange having a first opening and an eighth end, the first end of the first hook coupled to the first end of the first portion, the securing device coupled to the first portion, the second portion coupled to the securing device, and the flange coupled to the second portion;

a second element having second flange with a second opening, a third portion, and a second hook, the second flange coupled to the third portion and the second hook coupled to the third portion; and a compressive device located between the first flange and the second flange capable of moving the first flange and the second flange closer to each other.

13. A non-penetrating securing device as claimed in claim 12 further including a plurality of non-penetrating securing devices.

14. A non-penetrating securing device as claimed in claim 13 wherein the plurality of non-penetrating securing devices for a mounting system.

15. A non-penetrating securing as claimed in claim 13 wherein the plurality of non-penetrating securing devices form a non-penetrating securing system.

* * * * *